(12) United States Patent
Guo (10) Patent No.: US 10,598,988 B2
(45) Date of Patent: Mar. 24, 2020

(54) BACK LIGHT UNIT AND DISPLAY DEVICE (71) Applicants: BOE TECHNOLOGY GROUP CO., LTD., Beijing (CN); HEFEI BOE OPTOELECTRONICS TECHNOLOGY CO., LTD., Anhui (CN)

(72) Inventor: Yuanhui Guo, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 64 days.

(21) Appl. No.: 15/677,182

(22) Filed: Aug. 15, 2017

(65) Prior Publication Data
US 2018/0081222 A1   Mar. 22, 2018

(30) Foreign Application Priority Data
Sep. 18, 2016  (CN) .......................... 2016 1 0829241

(51) Int. Cl.
G02F 1/1335 (2006.01)
F21V 8/00 (2006.01)
G02F 1/1347 (2006.01)

(52) U.S. Cl.
CPC ......... G02F 1/13362 (2013.01); G02B 6/005 (2013.01); G02B 6/0056 (2013.01); G02F 1/133528 (2013.01); G02F 1/133621 (2013.01); G02F 1/1347 (2013.01); *G02F 1/133603* (2013.01); *G02F 1/133615* (2013.01); *G02F 2001/133614* (2013.01); *G02F 2202/36* (2013.01)

(58) Field of Classification Search
CPC ........... G02F 1/13362; G02F 1/133528; G02F 1/133621; G02F 1/1347; G02F 1/133615;
(Continued)

(56) References Cited
U.S. PATENT DOCUMENTS

| 7,403,332 | B2 * | 7/2008 | Whitehead | ........... H04N 9/3102 359/443 |
| 2010/0060810 | A1 | 3/2010 | Chang | |
| 2016/0093255 | A1 * | 3/2016 | Aoki | ..................... G09G 3/3426 345/690 |
| 2016/0131831 | A1 * | 5/2016 | Tomomasa | ........... G02B 6/0031 348/790 |

(Continued)

FOREIGN PATENT DOCUMENTS

| CN | 101790270 A | 7/2010 |
| CN | 103135280 A | 6/2013 |

(Continued)

OTHER PUBLICATIONS

First Office Action for Chinese Patent Application No. 201610829241.6 dated Nov. 2, 2018.

Primary Examiner — Shan Liu
(74) Attorney, Agent, or Firm — Calfee, Halter & Griswold LLP (57) ABSTRACT The embodiments of the present disclosure relate to a display device and a back light unit. The back light unit has a light-emitting member, a photoluminescence member and a polarization state-adjusting member. The light-emitting member is used to provide a back light, and the light-emitting member is divided into a plurality of first subregions with different brightness respectively. The photoluminescence member is used to emit various monochromatic light in perpendicular polarization direction with each other under stimulation of the back light. The various monochromatic light is combined into a white light to go into the (Continued)

polarization state-adjusting member. The polarization state-adjusting member is used to adjust polarization direction of a plurality of monochromatic light in the white light.

10 Claims, 8 Drawing Sheets

(58) Field of Classification Search
CPC .......... G02F 1/133603; G02F 2202/36; G02F 2001/133614; G02F 1/133617; G02B 6/0056; G02B 6/005; G02B 6/0011; G02B 6/0013; G02B 6/0015; G02B 6/0016; G02B 6/0018; G02B 6/002; G02B 6/0021; G02B 6/0023; G02B 6/0025; G02B 6/0026; G02B 6/0028; G02B 6/003; G02B 6/0031; G02B 6/0088
USPC .............................. 349/69–71, 65
See application file for complete search history.

(56) References Cited

U.S. PATENT DOCUMENTS

| 2016/0334556 | A1* | 11/2016 | Wu | G02B 5/207 |
| 2017/0108726 | A1* | 4/2017 | Yanai | G02B 5/30 |
| 2017/0123128 | A1* | 5/2017 | Wu | G02B 1/02 |
| 2017/0235174 | A1* | 8/2017 | Guo | G02F 1/1393 349/42 |
| 2017/0357119 | A1* | 12/2017 | Kim | G02F 1/133621 |
| 2018/0217449 | A1* | 8/2018 | Mifune | G02B 19/0066 |
| 2018/0275443 | A1* | 9/2018 | Chen | G02F 1/13362 |
| 2018/0340681 | A1* | 11/2018 | Cok | F21V 23/003 |

FOREIGN PATENT DOCUMENTS

| CN | 105093677 A | 11/2015 |
| CN | 105301828 A | 2/2016 |
| CN | 105527753 A | 4/2016 |

* cited by examiner

BACK LIGHT UNIT AND DISPLAY DEVICE

CROSS REFERENCE TO RELATED APPLICATIONS

This application claims the priority to and the benefit of Chinese Patent Application No. 201610829241.6, filed on Sep. 18, 2016, which is incorporated herein by reference in its entirety.

TECHNICAL FIELD

The present disclosure relates generally to the field of display technology, and particularly to a back light unit and a display device.

BACKGROUND

In the field of display technology, liquid crystal display panel, with its advantages of small size, low power consumption, non-radiation, high resolution or the like, has been widely applied in modern digital information electric appliances.

Different from other display modes (PDP, OLED, etc.), Thin Film Transistor (TFT for short) Liquid Crystal Display (LCD for short) in passive emitting mode adopts white light LED as light source, which will result in low color gamut and color distortion of products.

In order to improve color gamut of TFT LCD products, it is possible to increase thickness of color film and adopt LED with higher color gamut. However, due to the improved color gamut of TFT LCD products, brightness of the backlight and transmittance of the color film will reduce, which results in a high power consumption of the panel.

Therefore, how to improve color gamut of products while reduce power consumption of a back light is the technical problem needed to solve urgently by the person skilled in the art.

SUMMARY

The embodiments of the present disclosure provide the following technical solution, so as to achieve an effect of the present disclosure.

In one aspect, the present disclosure provides a back light unit, comprising: a light-emitting member, a photoluminescence member and a polarization state-adjusting member;

wherein, the light-emitting member is used to provide a back light, and the light-emitting member is divided into a plurality of first subregions with different brightness respectively;

the photoluminescence member is used to emit various monochromatic light in perpendicular polarization direction with each other under stimulation of the back light, and the various monochromatic light are combined into a white light to go into the polarization state-adjusting member; and the polarization state-adjusting member is used to adjust polarization direction of a plurality of monochromatic light in the white light.

In another aspect, the present disclosure provides a display device, comprising a back light unit, wherein, the back light unit comprises a light-emitting member, a photoluminescence member and a polarization state-adjusting member;

wherein, the light-emitting member is used to provide a back light, and the light-emitting member is divided into a plurality of first subregions with different brightness respectively;

the photoluminescence member is used to emit various monochromatic light in perpendicular polarization direction with each other under stimulation of the back light, and the various monochromatic light are combined into a white light to go into the polarization state-adjusting member; and the polarization state-adjusting member is used to adjust polarization direction of a plurality of monochromatic light in the white light.

DETAILED DESCRIPTION

A concrete implementation of a back light unit and a display device according to an embodiment of the present disclosure will be specifically and completely described combining with drawings.

It should be noted that the thickness and shape of every film shown in the drawings do not embody the real size of the back light unit but intends to indicatively explain the present disclosure.

Figure 1:
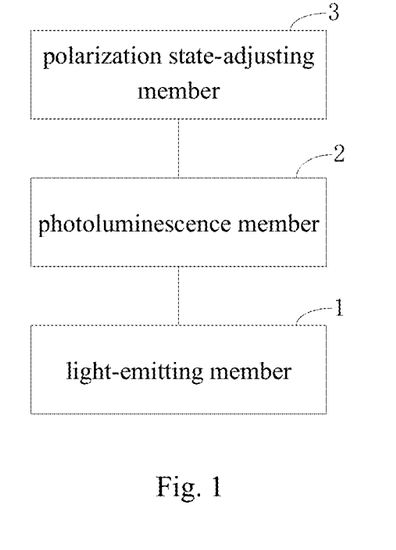
FIG. 1 is a schematic diagram illustrating a back light unit according to an embodiment of the present disclosure.
Figure 2:
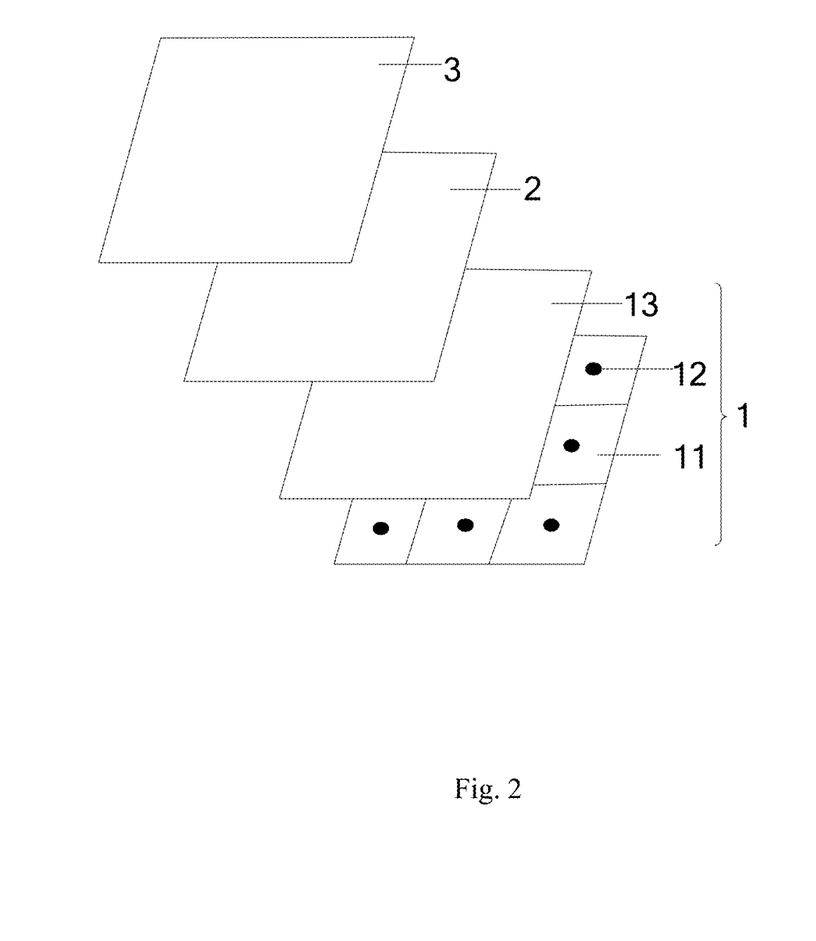
FIGS. 2 and 3 are schematic diagrams illustrating a concrete structure of the back light unit according to an embodiment of the present disclosure respectively.
Figure 3:
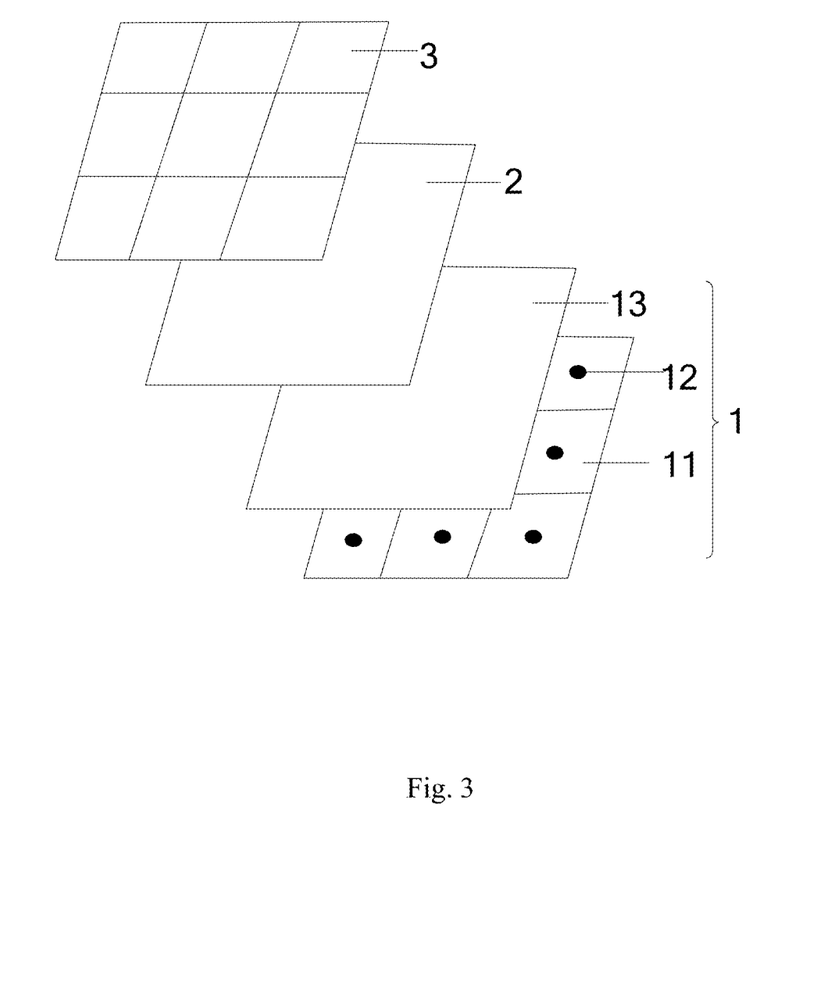

As shown in FIGS. 1 to 3, the back light unit according to an embodiment of the present disclosure includes a light-emitting member 1, a photoluminescence member 2 and a polarization state-adjusting member 3.

The light-emitting member 1 is used to provide a back light. The light-emitting member 1 is divided into a plurality of first subregions with different brightness respectively.

The photoluminescence member 2 is used to emit various monochromatic light in perpendicular polarization direction with each other under stimulation of the back light, and the various monochromatic light are combined into a white light to go into the polarization state-adjusting member 3.

The polarization state-adjusting member 3 is used to adjust polarization direction of a plurality of monochromatic light in the white light.

It should be noted that an expression of "a plurality of first subregions with different brightness respectively" refers to that in each frame, the brightness of light emitted from different first subregions is corresponding to display regions respectively.

In the back light unit according to an embodiment of the present disclosure, which is provided with a light-emitting member, a photoluminescence member and a polarization state-adjusting member, the light-emitting member is divided into a plurality of first subregions with different brightness respectively; the photoluminescence member emits various monochromatic light with perpendicular polarization direction with each other under stimulation of the back light, and the various monochromatic light are combined into a white light to go into the polarization state-adjusting member; and the polarization state-adjusting member adjusts polarization direction of a plurality of monochromatic light in the white light. For this, due to interaction among the light-emitting member, the photoluminescence member and the polarization state-adjusting member, it not only realizes a dynamical control of the spectrum of the back light, thusly improving color gamut of products, but also reduces power consumption of the back light.

During implementation, in the back light unit according to an embodiment of the present disclosure, as shown in FIG. 3, the polarization state-adjusting member 3 may be divided into a plurality of second subregions corresponding to the first subregions, the second subregions are used to adjust polarization direction of different monochromatic light in the white light in corresponding region. For this, based on the dynamical control of the brightness of the back light, it is realizable to dynamically control the spectrum of the back light in different second subregions by controlling the arrangement of the spectrum of the back light in the different regions.

It should be noted that each first subregion is controlled by a first control voltage signal, each second subregion is controlled by a second control voltage signal, and the first and second control voltage signals are provided by control device respectively.

During implementation, in the back light unit according to an embodiment of the present disclosure, in particular, the light-emitting member may include a light guide plate and a LED at a light incident side of the light guide plate; or the light-emitting member may include a back plane and a LED on the back plane. That is, the light-emitting member is divided into two kinds, edge type and direct type, depending on the positions where the light source emits. Taking FIGS. 2 and 3 for example, the light-emitting member 1 is in direct type, which may specifically include a back plane 11 and a LED 12 on the back plane 11.

Further, during implementation, in the back light unit according to an embodiment of the present disclosure, as shown in FIGS. 2 and 3, the light-emitting member 1 may further include a single layer or multiple layers of optical layer 13 at a light emergent side of the back plane 11. The optical layer could improve brightness uniformity of the emergent light from the back light unit, and the brightness of a display panel at the light emergent side of the back light unit at front view.

During implementation, in the back light unit according to an embodiment of the present disclosure, the photoluminescence member includes a quantum rod film. Due to the characteristics of the quantum rod, that is, spectrum is different under different polarized light, the back light unit adopts a technique of quantum rod film, such that color gamut and coordinate of white point of the back light could be adjusted freely, thusly expanding the field of application.

During implementation, in the back light unit according to an embodiment of the present disclosure, the LED may be a blue LED, while the quantum rod film may be a polymer film with red and green quantum rod. For this, red and green light in certain polarization direction could go out under stimulation of blue back light. It should be noted that material of quantum rod is composed of IIB. VIA group element (e.g. CdS, CdSe, CdTe, ZnSe, etc.) or IIIA. VA group element (e.g. InP, InAs, etc.), and has an inner diameter of 1-10 nm, and length of 10-100 nm. A main emission wavelength of the quantum rod film is affected by the type of the material and inner diameter of the quantum rod. Under stimulation of blue light, a green quantum rod has a main emission wavelength of 500-550 nm, and a red quantum rod has a main emission wavelength of 590-700 nm.

During implementation, in the back light unit according to an embodiment of the present disclosure, the polarization state-adjusting member may include a liquid crystal panel. The liquid crystal panel may include upper and lower electrodes and liquid crystal therebeween. The liquid crystal rotates under control of voltage between the upper and lower electrodes so as to change the polarization state of light passing through the liquid crystal panel. As shown in FIG. 3, the polarization state-adjusting member 3 may be divided into a plurality of second subregions corresponding to the first subregions, i.e., second subregions divided by the liquid crystal panel are corresponding to the first subregions divided by the light-emitting member respectively. In each frame, under control of voltage between the upper and lower electrodes, polarization direction of various monochromatic light in white light in corresponding region could be adjusted by liquid crystal in the second subregions, thusly changing polarization state of light.

The liquid crystal panel mentioned above may be Twisted Nematic (TN for short) panel, In-Plane Switchin (IPS for short) panel, or Fringe Field Switching (FFS for short) panel. Concerning a TN liquid crystal panel, it is just required to change voltage difference between the upper and lower electrodes in the TN liquid crystal panel so as to control rotation direction of liquid crystal in the TN liquid crystal panel. The liquid crystal panel could be chosen according to actual situation, which is not limited. In order to distinguish from a liquid crystal panel in the display panel used for displaying image, the liquid crystal panel mentioned above is called a first liquid crystal panel hereafter.

Based on the same inventive concept, a display device is provided in an embodiment of the present disclosure, which includes the above back light unit according to the embodiment of the present disclosure.

During implementation, in the back light unit according to an embodiment of the present disclosure, the display device may further include a first polarizer at a light emergent side of the back light unit, a second liquid crystal panel for displaying image disposed at a side of the first polarizer away from the back light unit, and a second polarizer disposed at a side of the second liquid crystal panel away from the first polarizer. Alternatively, under a condition that a direction of a penetration axis of the first polarizer is parallel or perpendicular to an arrangement direction of the quantum rod, the back light unit could have a high color gamut, which could improve color gamut of products effectively.

Figure 4:
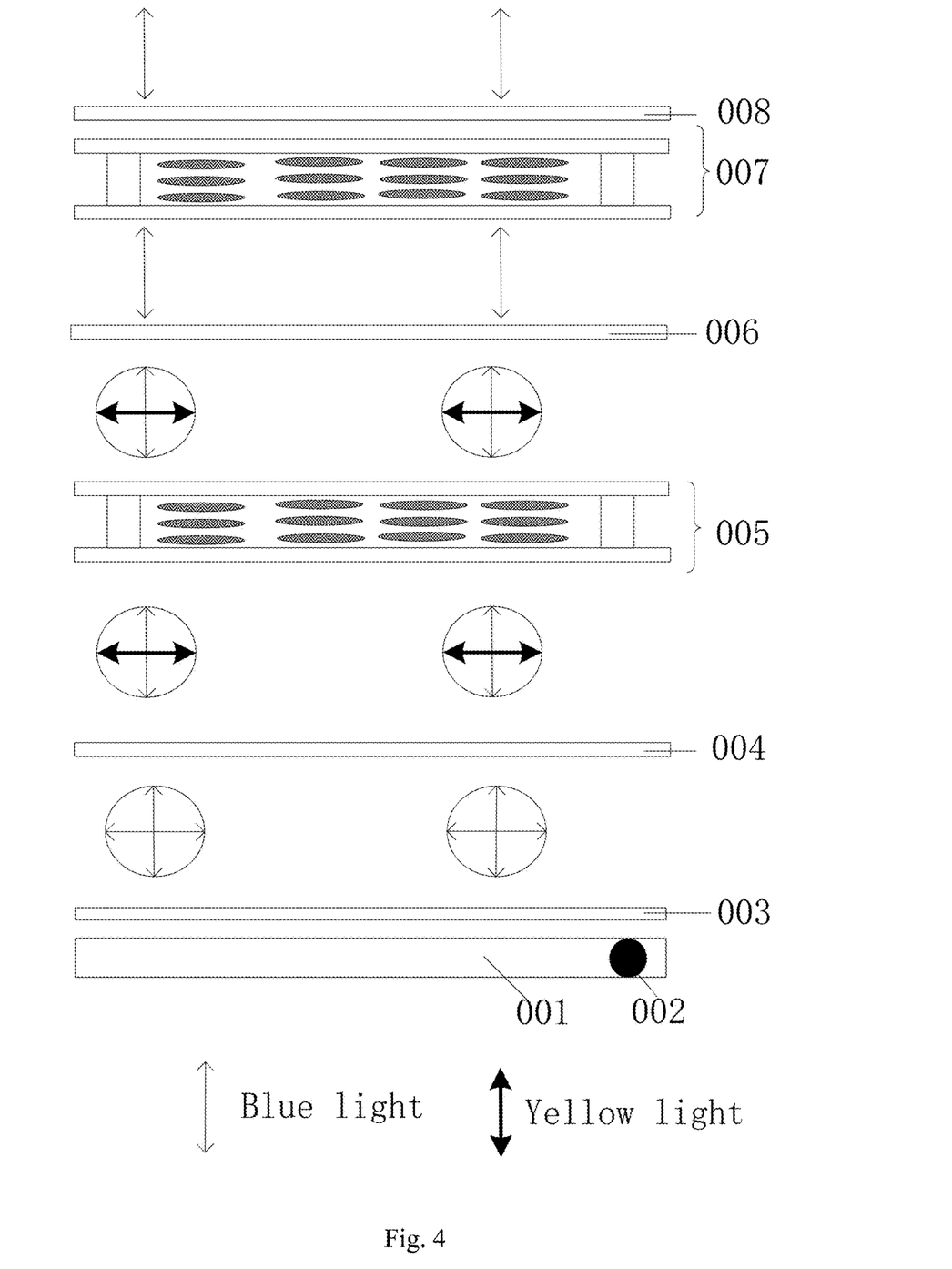
FIGS. 4 and 5 are schematic diagrams illustrating a concrete structure and light path of a display device according to an embodiment of the present disclosure.
Figure 5:
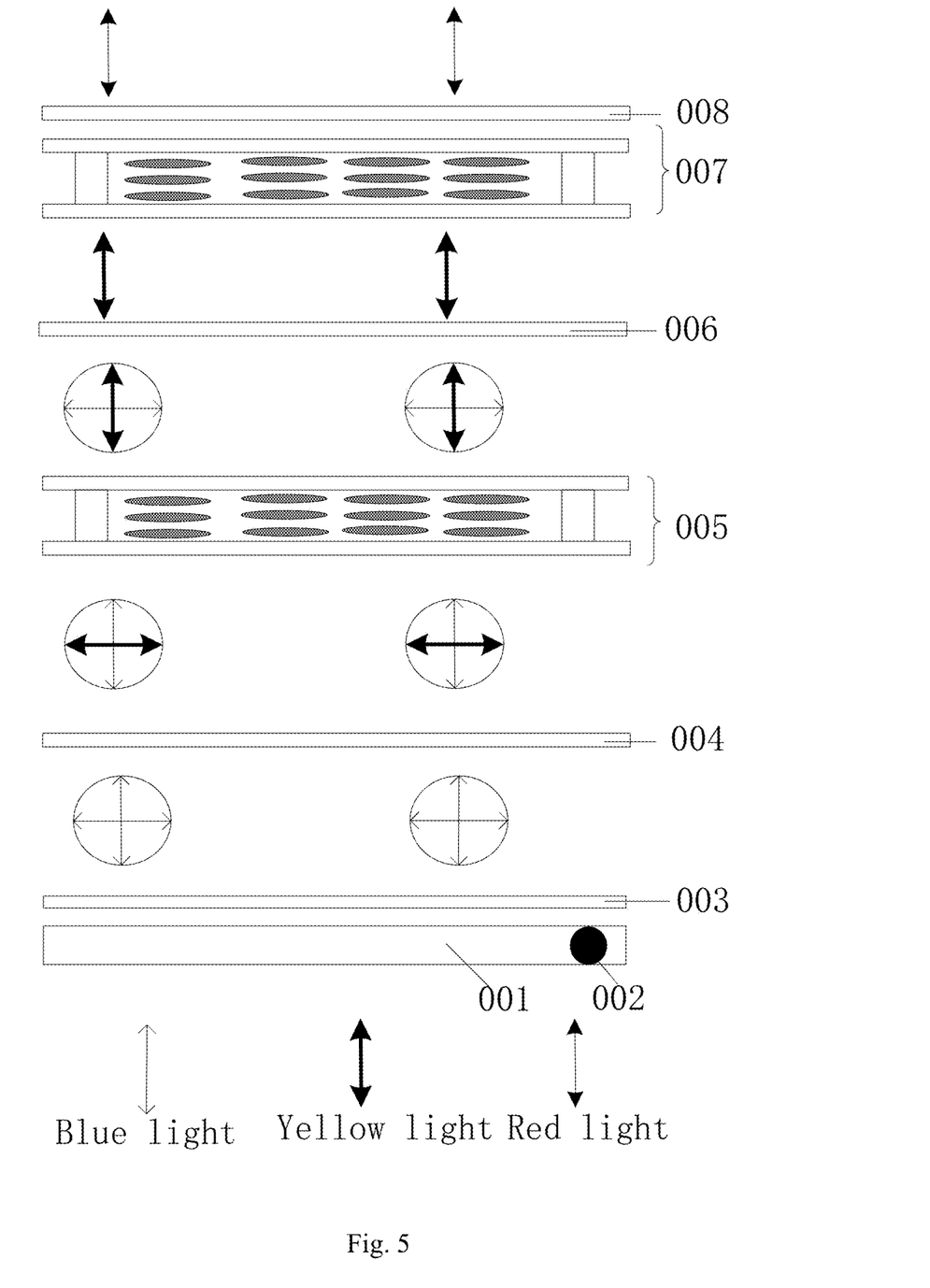

The following is a working process of the display device according to an embodiment of the present disclosure by taking FIGS. 4 and 5 for example (It should be noted that in FIGS. 4 and 5, the polarization direction of various monochromatic light only includes perpendicular direction and horizontal direction, and the types of the monochromatic light listed above are not limited but intend to explain the present disclosure).

In particular, the display device includes a light guide plate 001, a blue LED 002, an optical film 003, a quantum rod film 004 (the quantum rod film is a polymer film with red and green quantum rod), a first liquid crystal panel 005, a first polarizer 006, a second liquid crystal panel 007 for displaying image and a second polarizer 008. Wherein, the light guide plate 001 is divided into a plurality of first subregions with different brightness respectively; the first liquid crystal panel 005 is divided into a plurality of second subregions corresponding to the first subregions, the second subregions are used to adjust polarization direction of different monochromatic light in white light in corresponding region.

As shown in FIGS. 4 and 5, blue light emitted from the blue LED 002 (blue circular polarization may be decomposed into a blue light in perpendicular polarization direction and a blue light in horizontal polarization direction) passes through the light guide plate 001 and optical film 003, and transmits to the quantum rod film 004. Under stimulation of blue back light, blue light in perpendicular polarization direction and yellow light in horizontal polarization direction will pass through the quantum rod film 004 (It should be noted that the yellow light is a mix light with red and green light, and the quantum rod could only stimulate the light of incident light whose polarization direction is parallel with the arrangement of the quantum rod to emit red and green light in horizontal polarization direction).

As shown in FIG. 4, under a condition that the first liquid crystal panel 005 is not applied with power, the light passing through the first liquid crystal panel 005 is still blue light in perpendicular polarization direction and yellow light in horizontal polarization direction (It should be noted that a direction of a polarization axis of the first polarizer 006 is perpendicular to the arrangement of the quantum rod); and the light only includes blue light in perpendicular polarization direction after passing through the first polarizer 006, and then passes through the second liquid crystal panel 007 and the second polarizer 008, finally color of image displayed at corresponding region is blue.

As shown in FIG. 5, under a condition that the first liquid crystal panel 005 is applied with voltage, polarization directions of blue and yellow light will be changed. The light passing through the first liquid crystal panel 005 is changed into yellow light in perpendicular polarization direction and blue light in horizontal polarization direction; and then changed into yellow in perpendicular polarization direction after passing through the first polarizer 006, finally after the light passes through the second liquid crystal panel 007 and the second polarizer 008, color of image displayed at corresponding region is red, green or a mixed color including red and green.

Figure 6:
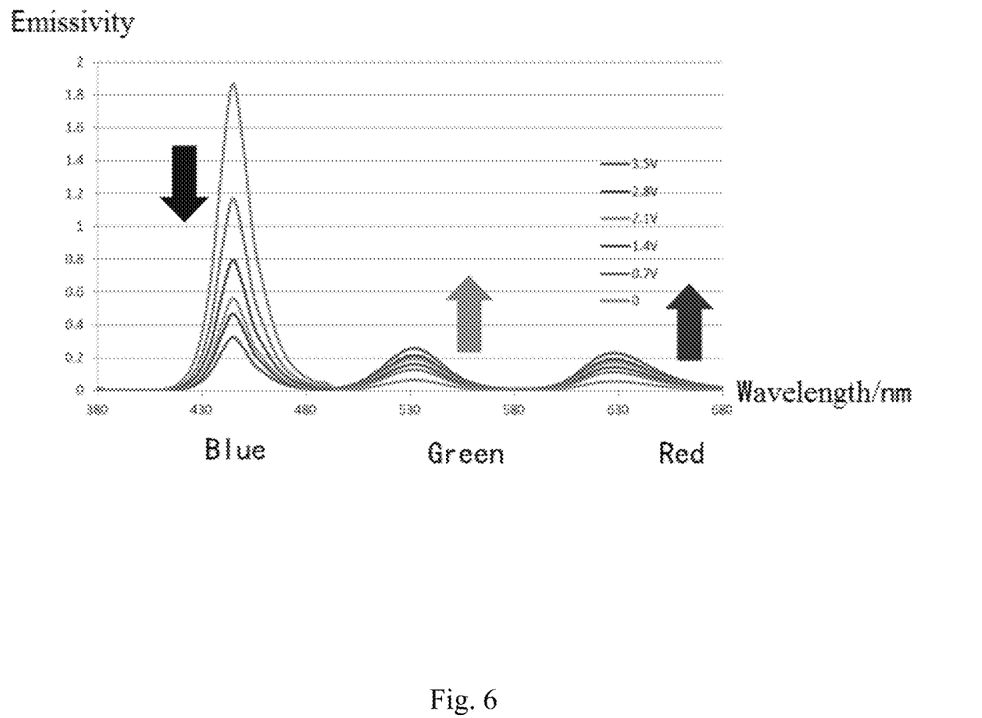
FIG. 6 is an emission spectrum chart corresponding to a dynamic backlight having passed through a first liquid crystal panel and a first polarizer under various control voltage according to an embodiment of the present disclosure.

It should be noted that the polarization state of light could not be changed by the first liquid crystal panel without power. When applying voltage to the first liquid crystal panel, under control of various voltage, the spectrum of the back light will be changed. FIG. 6 is an emission spectrum chart corresponding to a dynamic backlight having passed through the first liquid crystal panel and the first polarizer under various control voltage, wherein, the abscissa denotes wavelength, and ordinate denotes emittance (i.e., emissivity). During change of voltage from 0V to 3.5V, a crest of blue light decreases gradually, while a crest of red and green light rises gradually. For this, the spectrum emitted from various second subregions could be changed by controlling the voltage applied to the first liquid crystal panel, such that it is realizable to dynamically control the spectrum of the back light from various second subregions.

During implementation, in the back light unit according to an embodiment of the present disclosure, in order to reduce power consumption of a dynamical back light, and minimize the power consumption, the polarization state-adjusting member of the back light unit is designed to adjust polarization direction of various light depending on color information of image displayed by the second liquid crystal panel.

It should be noted that the expression of "depending on color information of image displayed by the second liquid crystal panel" may particularly refer to that: firstly testing color coordinates of RGB of normal product (non-dynamical back light product) in different gray scales by optical software, then converting original different gray-scale signals of RGB into RGB voltage signal, first control voltage signal of each first subregion and second control voltage signal of each second subregion by theoretic calculation; finally transmitting the above signal to a control device (e.g. IC chip). For this, based on the above signal, polarization direction of various monochromatic light in white light could be adjusted by the polarization state-adjusting member of the back light unit.

Figure 7:
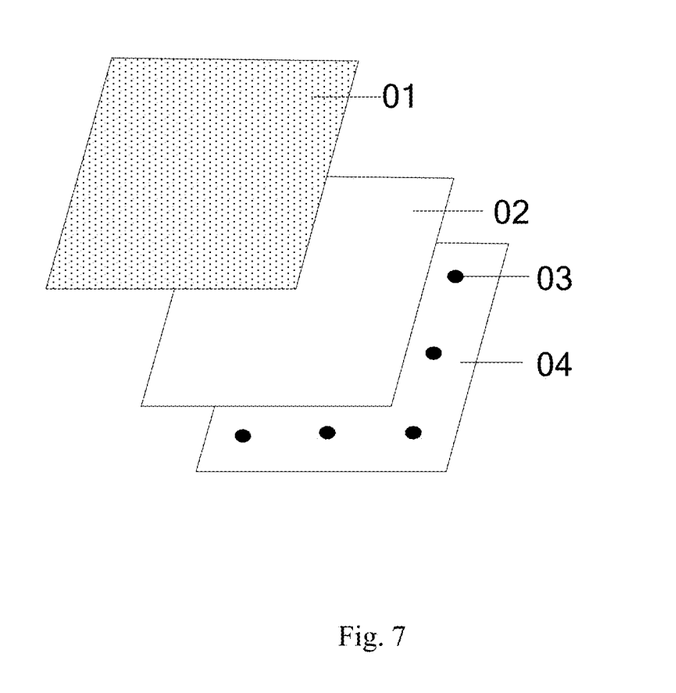
FIG. 7 is a schematic diagram of the back light unit according to an embodiment of the present disclosure.

Currently, in a back light unit according to an embodiment of the present disclosure, as shown in FIG. 7, which adopts quantum dot film 01 to improve color gamut of products, however, during conversion from blue light to white light, due to the loss of stimulated energy, brightness of back light of the product adopting the quantum dot film is low, and more luminous flux is lost during conversion by quantum dot film and color filter. In FIG. 7, reference number 02 denotes the optical film, reference number 03 denotes the LED, and reference number 04 denotes the back plane.

Figure 8:
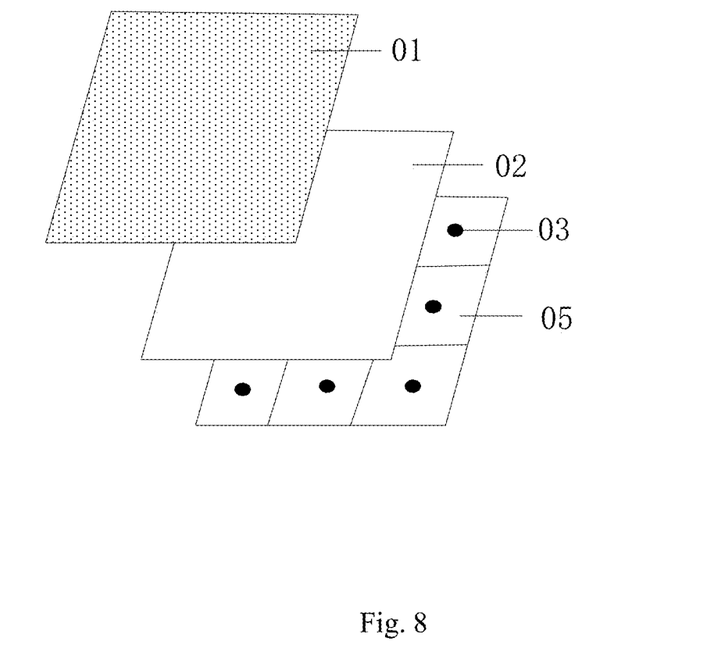
FIG. 8 is a schematic diagram of a dynamic backlight unit according to an embodiment of the present disclosure.

In a dynamic back light unit according to another embodiment of the present disclosure, as shown in FIG. 8, a back plane is divided to form a back plane 05 including a plurality of subregions (in FIG. 8, reference number 01 denotes a quantum dot film, reference number 02 denotes an optical film, and reference number 03 denotes a LED). An effect of dynamical display is achieved by controlling brightness of back light at different subregions. The dynamical back light technology is widely used in the display field. However, the dynamical back light technology is just a dynamical form of brightness, as for the product with high color gamut, if the thickness of color film increases, then the transmittance of screens will decrease; and if the color gamut of the back light is improved, then brightness of the back light will decrease, thusly increasing power consumption of products.

In particular, Table 1 lists tested parameters of LED power consumption voltage of 9 groups of images in different colors displayed by the back light unit in FIG. 7, dynamical back light unit in FIG. 8, and the back light unit in FIG. 3 according to the present disclosure (by taking a 32-inch back light unit sample for example).

TABLE 1

|  |  | RGB gray scale |  | Voltage of blue pixel (V) | Voltage of green pixel(V) | Voltage of red pixel(V) | Voltage of liquid crystal panel(V) | LED power consumption voltage(V) |
|---|---|---|---|---|---|---|---|---|
| Image 1 | B | 255 | Normal back light | 4.2 | 0 | 0 | N/A | 1.5 |
|  | G | 0 | Dynamical back light | 4.2 | 0 | 0 | N/A | 1.5 |

TABLE 1-continued

| | | RGB gray scale | | Voltage of blue pixel (V) | Voltage of green pixel(V) | Voltage of red pixel(V) | Voltage of liquid crystal panel(V) | LED power consumption voltage(V) |
|---|---|---|---|---|---|---|---|---|
| | R | 0 | Back light of the present disclosure | 4.2 | 0 | 0 | 3.5 | 0.3 |
| Image 2 | B | 127 | Normal back light | 2.8 | 0 | 0 | N/A | 1.5 |
| | G | 0 | Dynamical back light | 4.2 | 0 | 0 | N/A | 0.75 |
| | R | 0 | Back light of the present disclosure | 4.2 | 0 | 0 | 3.5 | 0.3 |
| Image 3 | B | 255 | Normal back light | 4.2 | 2.8 | 2.8 | N/A | 1.5 |
| | G | 127 | Dynamical back light | 4.2 | 2.8 | 2.8 | N/A | 1.5 |
| | R | 127 | Back light of the present disclosure | 4.2 | 4.2 | 4.2 | 1.7 | 0.5 |
| Image 4 | B | 127 | Normal back light | 2.8 | 2.8 | 2.8 | N/A | 1.5 |
| | G | 127 | Dynamical back light | 4.2 | 4.2 | 4.2 | N/A | 0.75 |
| | R | 127 | Back light of the present disclosure | 4.2 | 4.2 | 4.2 | 3.5 | 0.75 |
| Image 5 | B | 255 | Normal back light | 4.2 | 4.2 | 4.2 | N/A | 1.5 |
| | G | 255 | Dynamical back light | 4.2 | 4.2 | 4.2 | N/A | 1.5 |
| | R | 255 | Back light of the present disclosure | 4.2 | 4.2 | 4.2 | 3.5 | 1.5 |
| Image 6 | B | 255 | Normal back light | 4.2 | 4.2 | 0 | N/A | 1.5 |
| | G | 255 | Dynamical back light | 4.2 | 4.2 | 0 | N/A | 1.5 |
| | R | 0 | Back light of the present disclosure | 4.2 | 4.2 | 0 | 3.5 | 1.5 |
| Image 7 | B | 0 | Normal back light | 0 | 0 | 4.2 | N/A | 1.5 |
| | G | 0 | Dynamical back light | 0 | 0 | 4.2 | N/A | 1.5 |
| | R | 255 | Back light of the present disclosure | 0 | 0 | 4.2 | 3.5 | 1.5 |
| Image 8 | B | 0 | Normal back light | 0 | 4.2 | 0 | N/A | 1.5 |
| | G | 255 | Dynamical back light | 0 | 4.2 | 0 | N/A | 1.5 |
| | R | 0 | Back light of the present disclosure | 0 | 4.2 | 0 | 3.5 | 1.5 |
| Image 9 | B | 255 | Normal back light | 4.2 | 2.8 | 0 | N/A | 1.5 |
| | G | 127 | Dynamical back light | 4.2 | 2.8 | 0 | N/A | 1.5 |
| | R | 0 | Back light of the present disclosure | 4.2 | 4.2 | 0 | 3.5 | 0.5 |

It can be seen from Table 1, under a condition that display effect of color image displayed by the back light unit in FIG. 7, dynamical back light unit in FIG. 8, and the back light unit in FIG. 3 according to the present disclosure is identical, the dynamical back light unit provided by the present disclosure could reduce LED power consumption. Especially in case that images 1, 2, 3 and 9 display bluish color, the LED power consumption is less than 0.5V in the dynamical back light unit according to the present disclosure, which dramatically reduces LED power consumption. The main reason that the dynamical back light unit according to the present disclosure could reduce LED power consumption is that: under inter-action of photoluminescence member and the polarization state-adjusting member in the back light unit according to the present disclosure, the back light could be changed into various adjustable monochromatic light in perpendicular polarization direction with each other, after being adjusted and passing through the first polarizer, the various monochromatic light has a transmittance much higher than that in the normal back light unit and the current dynamical back light unit, such that brightness of LED to be required is relatively lower, thusly reducing the LED power consumption.

The display device may be: a mobile phone, a tablet computer, a TV, a display, a laptop, a digital photo frame, a navigator or any product or element having display function. Other elements necessary to the display device are understood by the person skilled in the art, which are not described repeatedly, and do not intend to limit the present disclosure. The display device may be operated referring to the above embodiment of the back light unit, and repeated contents will not be redundantly explained.

In the back light unit and display device according to an embodiment of the present disclosure, which is provided with a light-emitting member, a photoluminescence member and a polarization state-adjusting member, the light-emitting member is used to provide a back light, and the light-emitting member is divided into a plurality of first subregions with different brightness respectively; the photoluminescence member emits various monochromatic light with perpendicular polarization direction with each other under stimulation of the back light, and the various monochromatic light are combined into a white light to go into the polarization state-adjusting member; and the polarization state-adjusting member adjusts polarization direction of a plurality of monochromatic light in white light. For this, due to interaction among the light-emitting member, the photoluminescence member and the polarization state-adjusting member in the back light according to the embodiment of the present disclosure, it not only realizes a dynamical control of the spectrum of the back light, thusly improving color gamut of products, but also reduces power consumption of the back light.

One of ordinary skill in the art can make various changes and modifications to the present disclosure without departing from the spirit and scope of the invention. Thus, the present disclosure intends to encompass such changes and modifications provided that those changes and modifications fall within the scope of claims of the present invention and equivalents thereof

What is claimed is:

1. A back light unit, comprising: a light-emitting member, a photoluminescence member and a polarization state-adjusting member;
    wherein, the light-emitting member is used to provide a back light, the light-emitting member comprising a back plane and a plurality of LEDs on the back plane, and the back plane is divided into a plurality of first subregions distributed in a matrix with different brightness respectively, each of the LEDs is disposed in each of the first subregions;
    and the light-emitting member is divided into a plurality of first subregions with different brightness respectively;
    the photoluminescence member comprises a quantum rod film and is used to emit various monochromatic light in perpendicular polarization direction with each other under stimulation of the back light, and the various monochromatic light are combined into a white light to go into the polarization state-adjusting member; and
    the polarization state-adjusting member comprises a liquid crystal panel including a liquid crystal layer and is used to adjust polarization direction of a plurality of monochromatic light in the white light;
    wherein the polarization state-adjusting member is divided into a plurality of second subregions distributed in a matrix, the plurality of second subregions corresponding to the plurality of first subregions one by one, projection of each of the plurality of second subregions on the back plane overlapping with the first subregion corresponding thereto; and the second subregions are used to adjust polarization direction of different monochromatic light in the white light in corresponding region;
    wherein the light-emitting member and the polarization state-adjusting member are disposed facing with each other, and the photoluminescence member is disposed between the light-emitting member and the polarization state-adjusting member; and
    wherein no polarizers are provided between the quantum rod film and the liquid crystal layer.

2. The back light unit according to claim 1, wherein the light-emitting member further comprises a single layer or multiple layers of optical layer at a light emergent side of the back plane.

3. The back light unit according to claim 2, wherein the LED is a blue LED; and the quantum rod film is a polymer film with red and green quantum rod.

4. The back light unit according to claim 1, wherein the liquid crystal panel is Twisted Nematic panel, In-Plane Switching panel, or Fringe Field Switching panel.

5. A display device, comprising: a back light unit, wherein, the back light unit comprises a light-emitting member, a photoluminescence member and a polarization state-adjusting member;
    wherein, the light-emitting member is used to provide a back light, the light-emitting member comprising a back plane and a plurality of LEDs on the back plane, and the back plane is divided into a plurality of first subregions distributed in a matrix with different brightness respectively, each of the LEDs is disposed in each of the first subregions;
    the light-emitting member is divided into a plurality of first subregions with different brightness respectively;
    the photoluminescence member comprises a quantum rod film and is used to emit various monochromatic light in perpendicular polarization direction with each other under stimulation of the back light, and the various monochromatic light are combined into a white light to go into the polarization state-adjusting member; and
    the polarization state-adjusting member comprises a first liquid crystal panel including a first liquid crystal layer and is used to adjust polarization direction of a plurality of monochromatic light in the white light;
    wherein the polarization state-adjusting member is divided into a plurality of second subregions distributed in a matrix, the plurality of second subregions corresponding to the plurality of first subregions one by one, projection of each of the plurality of second subregions on the back plane overlapping with the first subregion corresponding thereto; and the second subregions are used to adjust polarization direction of different monochromatic light in the white light in corresponding region;
    wherein the light-emitting member and the polarization state-adjusting member are disposed facing with each other, and the photoluminescence member is disposed between the light-emitting member and the polarization state-adjusting member; and
    wherein no polarizers are provided between the quantum rod film and the liquid crystal layer.

6. The display device according to claim 5, wherein the display device further comprises a first polarizer at a light emergent side of the back light unit, a second liquid crystal panel for displaying image disposed at a side of the first polarizer away from the back light unit, and a second polarizer disposed at a side of the second liquid crystal panel away from the first polarizer.

7. The display device according to claim 6, wherein the polarization state-adjusting member of the back light unit is used to adjust polarization direction of a plurality of monochromatic light in the white light depending on color information of the image displayed by the second liquid crystal panel.

8. The display device according to claim 7, wherein the first liquid crystal panel is Twisted Nematic panel, In-Plane Switchin panel, or Fringe Field Switching panel.

9. The display device according to claim 6, wherein the light-emitting member further comprises a single layer or multiple layers of optical layer at a light emergent side of the back plane.

10. The display device according to claim 9, wherein the LED is a blue LED; and the quantum rod film is a polymer film with red and green quantum rod.

* * * * *